D. BROWN.
PULSATOR FOR MILKING MACHINES.
APPLICATION FILED JAN. 25, 1909.
930,833.
Patented Aug. 10, 1909.
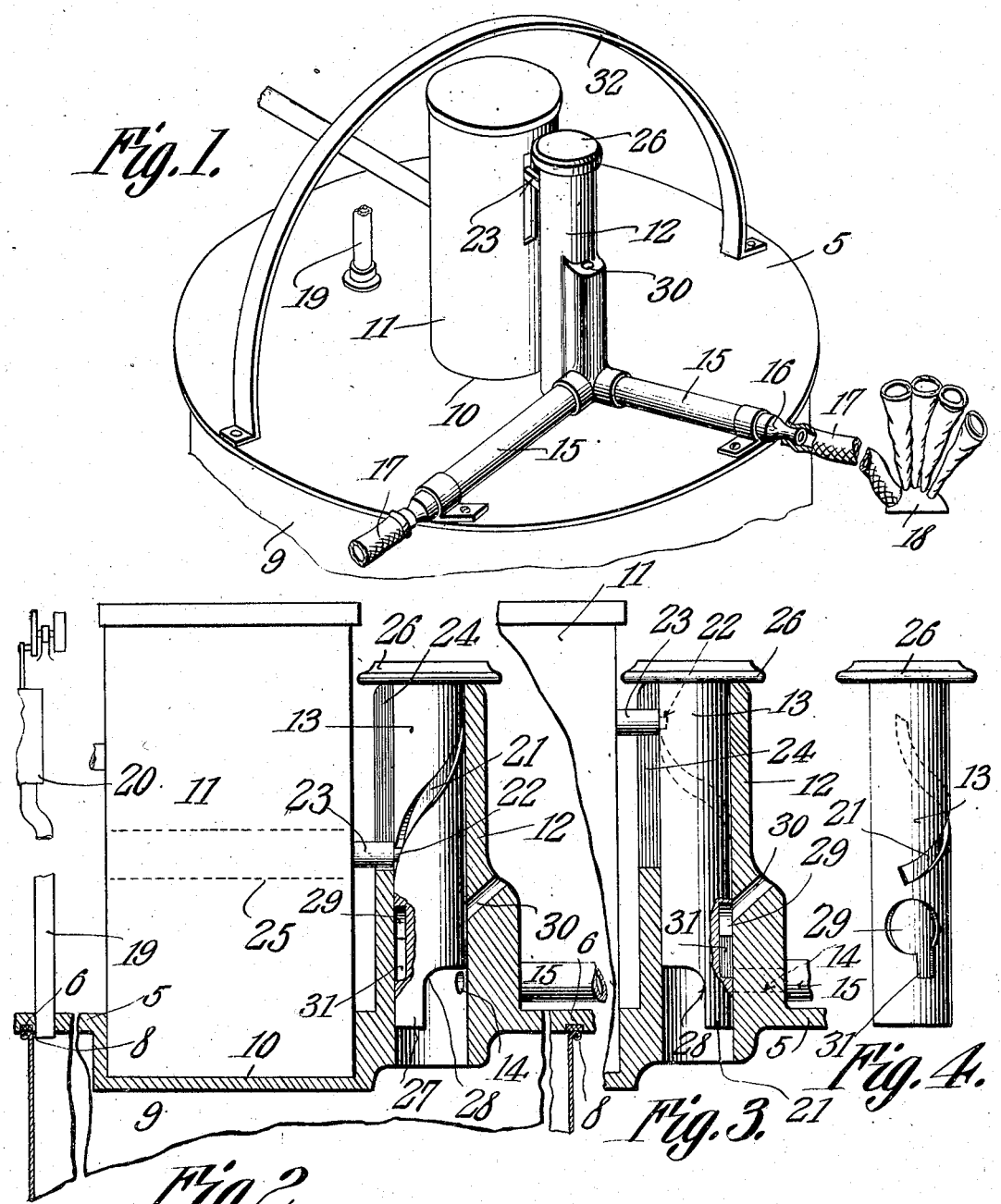

UNITED STATES PATENT OFFICE.

DAVID BROWN, OF SPOKANE, WASHINGTON.

PULSATOR FOR MILKING-MACHINES.

No. 930,833.  Specification of Letters Patent.  Patented Aug. 10, 1909.

Application filed January 25, 1909. Serial No. 474,064.

*To all whom it may concern:*

Be it known that I, DAVID BROWN, a citizen of the United States, residing at Spokane, in the county of Spokane and State of Washington, have invented a new and useful Pulsator for Milking-Machines, of which the following is a specification.

This invention relates to milking machines and more particularly to a mechanically operated pulsator for use in connection with said machines.

The object of the invention is to provide a milking machine having a pulsator mounted for oscillation in a casing or housing and actuated by an engine or other motive power for applying suction intermittently to the teat cups.

A further object is to provide an oscillating pulsator capable of being quickly detached from the engine so as to permit the pulsator to be readily removed and cleaned or sterilized when necessary.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a perspective view of a milking machine constructed in accordance with my invention showing the same in position on a milk-receiving vessel or pail. Fig. 2 is a vertical sectional view partly in elevation showing the pulsator in position to establish communication between the teat cups and the interior of the pail. Fig. 3 is a similar view showing the pulsator in reversed position. Fig. 4 is a side elevation of the pulsator detached.

Similar numerals of reference indicate corresponding parts in all of the figures of the drawings.

The milking machine forming the subject matter of the present invention includes a cap-piece or support 5 preferably circular in shape, as shown, and provided with an annular groove 6 for the reception of a yieldable packing 8, the latter being adapted to rest on the upper edge of the milk-receiving vessel, indicated at 9. The cap-piece or support 5 is provided with a depression or pocket 10 adapted to receive the cylinder of an engine or other source of motive power 11 but from which pocket the engine is readily removable.

Secured to or formed integral with the cap or support 5 is a vertically disposed casing or housing 12 in which is mounted for oscillation a pulsator 13. The side walls of the casing 12 at the lower end thereof are provided with one or more ports 14 to which are connected short pipe sections 15 having their ends reduced to form nozzles 16 for engagement with flexible hose sections 17, the latter being provided with teat cups 18 of any approved construction.

Extending through an opening in the cap or support 5 is a pipe 19, one end of which is operatively connected with a pump 20, while the opposite end thereof extends within the pail or vessel 9 so that when the pump is operated suction will be created in the pail and the milk drawn through the pipes 15 and ports 14 into said pail.

The pulsator 13 is preferably cylindrical in shape, as shown, and is provided with a spirally disposed groove 21 extending approximately half way around the circumference of the pulsator and which receives the reduced end 22 of a pin 23. One end of the pin 23 is rigidly secured to and movable with the piston of the engine 11, while the opposite end thereof travels in a vertically disposed slot 24 formed in the adjacent wall of the casing 12. Thus it will be seen that as the piston 25 reciprocates within the cylinder 11, the reduced terminal 22 of the pin 23 will travel in the spiral groove 21 and oscillate the pulsator in a horizontal plane. The upper end of the pulsator is provided with an enlarged head 26 which bears against the adjacent end of the casing 12 and forms in effect a bearing for the pulsator. The lower end of the pulsator is provided with a depending extension 27 defining a port 28 adapted to register with the port or ports 14 when the valve is in one position to permit the flow of milk from the teats into the vessel 19, the extension 27 being adapted to register with and close the port or ports 14 at each oscillation of the pulsator so as to intermittently interrupt the suction and thus produce the desired pulsations necessary to effect the milking operation. One wall of the pulsator 13 is formed with an air port 29 adapted to register with a corresponding air port 30 formed in the casing 12, there being a relatively narrow port or passage 31 communicating with the port 29 and through which the air passes from the ports 30 and 29 to the pipes or conductors 15, thereby to interrupt the suction at the teats 18. Thus it will be seen that as the piston of the engine or motor 11 reciprocates the pulsator 13, being held down by air pressure because of the partial vacuum in the milk receiving vessel, will be oscillated within the casing 12 so as to cause the extension 27 to alternately open and close the port or ports 14, in the manner before stated.

When it is desired to clean or sterilize the pulsator it is merely necessary to exert an upward pull on the head 26 when the pulsator may be readily withdrawn from the casing, the engine 11 being at the same time or previously lifted out of the pocket 10.

A suitable bail or handle 32 is rigidly secured to the cap or support 5 to facilitate transporting the mechanism from place to place.

While I have shown the motor and pulsator mounted on the cap or support it is obvious that said parts may be supported at a point remote from the milk containing vessel without departing from the spirit of the invention. It will also be understood that any form of motor may be employed for actuating the pulsator, the type shown in the present instance being portable.

Having thus described the invention what is claimed is:—

1. In a milking machine, the combination with suction mechanism, of an oscillating pulsator for intermittently interrupting the suction, and a reciprocating motor operatively connected with the pulsator for actuating the latter, the axis of oscillation of the pulsator being parallel to the path of reciprocation of the motor.

2. In a milking machine, the combination with suction mechanism, an oscillating pulsator for intermittently interrupting the suction and having a spiral groove formed therein, a motor, and means carried by the motor and extended within the groove of the pulsator for actuating the latter.

3. In a milking machine, the combination with suction mechanism, a casing having a port, a teat cup, a conductor connecting the teat cup and port, a pulsator mounted for oscillation in said casing and provided with a spiral groove, a motor, and a pin carried by the motor and operated within the spiral groove, thereby to alternately open and close the port in the casing.

4. In a milking machine, the combination with suction mechanism, of a casing having a lateral fluid intake port and provided with a lateral air intake port and discharging fluid at one end, a pulsator mounted for oscillation within the casing and having a portion extending in the direction of the axis of oscillation and adapted to alternately open and close the fluid intake port, said pulsator being provided with a port adapted to register with the air intake, and also provided with a pocket forming an extension of said port to permit the passage of air from the said port to the fluid port, and a motor for oscillating the pulsator.

5. In a milking machine, a support adapted to rest on a milk receiving vessel, mechanism for producing suction within the milk-receptacle, a casing carried by the support and having a fluid intake port and provided with an air port, a valve mounted for oscillation within the casing and adapted to alternately open and close the air and fluid ports, respectively, said valve being held in place by the reduction of air pressure in the milk receiving vessel, and a motor mounted on the support and operatively connected with the pulsator for actuating the latter.

6. In a milking machine, the combination with suction mechanism, a casing having a fluid intake port and provided with a longitudinal slot, a teat cup, a conductor connecting the intake port and teat cup, a pulsator mounted for oscillation within the casing and adapted to alternately open and close the intake port, said pulsator having a spiral groove formed therein, a motor including a piston, and a pin extending laterally from the piston and projecting through the slot in the casing for engagement with the spiral groove, thereby to actuate the pulsator.

7. In a milking machine, the combination with suction mechanism, of a casing provided with fluid and air inlet ports and having a vertical slot formed in one wall thereof, a teat cup, a conductor connecting the fluid port and teat cup, a pulsator mounted for oscillation in said casing and having its upper end provided with an enlarged head adapted to bear against the adjacent end of the casing, said valve being provided with a spiral groove and having its lower end cut away to produce a longitudinal extension adapted to alternately open and close the fluid intake port, there being an air port formed in the pulsator above the extension and adapted to register with the air inlet of the casing to permit the passage of air from said port to the fluid port at predetermined intervals, a motor, and a pin carried by the motor and operating within the groove of the pulsator for actuating the latter.

In testimony that I claim the foregoing as my own, I have hereto affixed my signature in the presence of two witnesses.

DAVID BROWN.

Witnesses:
JOHN E. BLAIR,
JAMES TAYLOR BURCHAM.